United States Patent
Park et al.

(10) Patent No.: US 12,301,571 B2
(45) Date of Patent: *May 13, 2025

(54) METHOD AND APPARATUS FOR USER AUTHENTICATION BASED ON BLOCK CHAIN

(71) Applicant: POSTECH ACADEMY—INDUSTRY FOUNDATION, Pohang-si (KR)

(72) Inventors: Chan Ik Park, Pohang-si (KR); Jeong Hyeon Ma, Ansan-si (KR)

(73) Assignee: POSTECH ACADEMY—INDUSTRY FOUNDATION, Pohang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,878

(22) Filed: Jan. 3, 2023

(65) Prior Publication Data

US 2023/0254310 A1 Aug. 10, 2023

Related U.S. Application Data

(63) Continuation of application No. 16/539,341, filed on Aug. 13, 2019, now Pat. No. 11,582,234.

(30) Foreign Application Priority Data

Aug. 13, 2018 (KR) .................. 10-2018-0094457

(51) Int. Cl.
*H04L 9/40* (2022.01)

(52) U.S. Cl.
CPC ........ *H04L 63/0884* (2013.01); *H04L 63/083* (2013.01); *H04L 63/0876* (2013.01)

(58) Field of Classification Search
CPC ............ H04L 63/0884; H04L 63/0876; H04L 63/083; H04L 63/0807; H04L 9/321; H04L 9/3239; H04L 2209/56; H04L 2209/38; G06Q 20/385; G06Q 20/38215
See application file for complete search history.

(56) References Cited

U.S. PATENT DOCUMENTS

| | | | |
|---|---|---|---|
| 10,102,526 B1* | 10/2018 | Madisetti | G06Q 20/389 |
| 2016/0180338 A1* | 6/2016 | Androulaki | H04L 9/3228 |
| | | | 705/71 |
| 2016/0261411 A1* | 9/2016 | Yau | G06Q 20/38215 |
| 2020/0007322 A1* | 1/2020 | Weldemariam | G06F 16/1805 |
| 2020/0366484 A1* | 11/2020 | So | H04L 9/3213 |
| 2021/0166221 A1* | 6/2021 | Noh | G06Q 20/3825 |

* cited by examiner

*Primary Examiner* — Khoi V Le

(74) *Attorney, Agent, or Firm* — Morgan, Lewis & Bockius LLP

(57) ABSTRACT

A user authentication method performed by an authentication management server constituting a block chain network with a target device may comprise receiving, from the target device, a transaction including authentication information of a user and a unique value of the target device; determining a token of the user stored in a smart contract based on the authentication information; and authenticating the user based on validity information of the token, ownership information of the token, and the transaction.

20 Claims, 6 Drawing Sheets

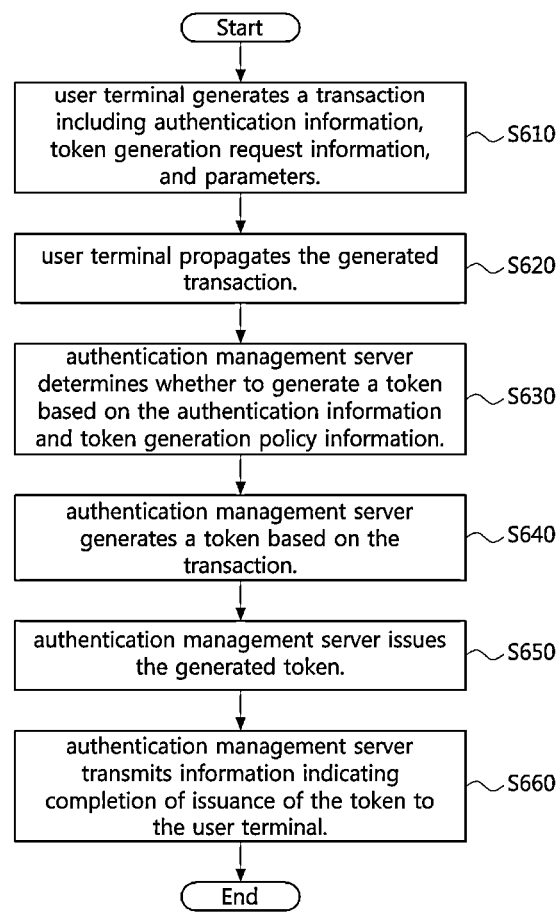

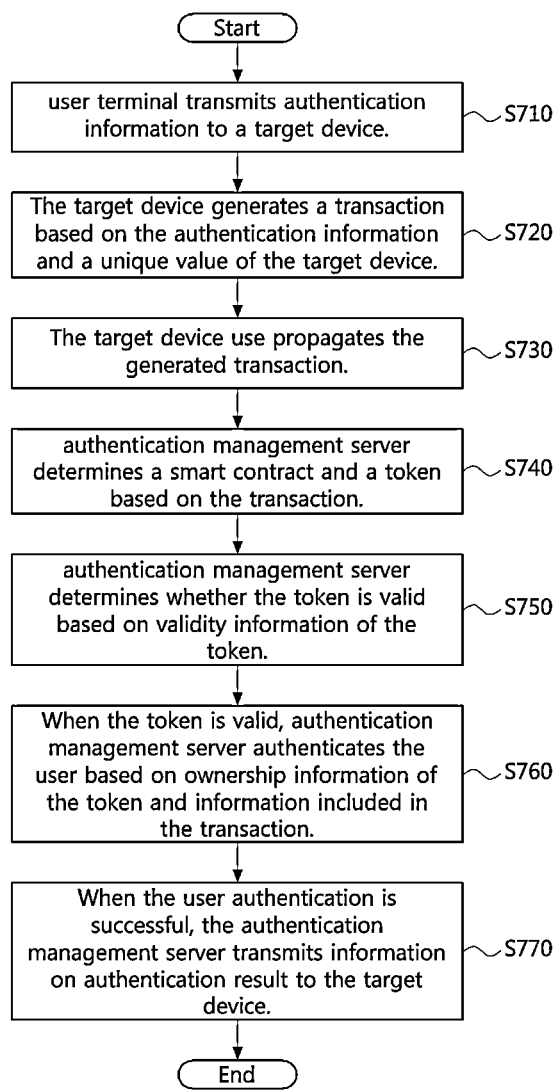

METHOD AND APPARATUS FOR USER AUTHENTICATION BASED ON BLOCK CHAIN

CROSS-REFERENCES TO RELATED APPLICATIONS

This is a continuation of U.S. application Ser. No. 16/539,341, filed on Aug. 13, 2019, now U.S. Pat. No. 11,582,234, which claims the benefit of priority to Korean Patent Application No. 10-2018-0094457, filed on Aug. 13, 2018 with the Korean Intellectual Property Office (KIPO), the entirety of each of which is incorporated herein by reference.

TECHNICAL FIELD

The present disclosure relates to a method and an apparatus for user authentication based on block chain technology, and more specifically, to a method and an apparatus for user authentication based on a non-fungible token generated using a smart contract.

BACKGROUND

In general, user authentication is performed by verifying a user's identity at a central server and transmitting the corresponding authentication information to the user. The user stores the transmitted authentication information in a smartphone and submits the stored authentication information later to be verified. Here, the authentication information should be basically impossible to duplicate and forgery, and should also be able to support a function that can be delegated to other users.

In the case that the central server delivers the authentication information to the smartphone and stores it, since it is impossible to duplicate the authentication information stored on the smartphone, the authentication information should be reissued when the smartphone is lost or changed, and delegation of the authentication information is impossible in principle. Also, since a signature using a secret key of the central server that issues the authentication information is required to prevent forgery of the authentication information, there is also a problem in that the complexity of the authentication process is increased.

With the recent proliferation of block chain technologies, a method of applying a block chain to user authentication has emerged. In general, a user authentication method using a block chain may store and maintain a public key in a block chain from a pair of a private key and the public key issued to a user by using a public key infrastructure, may generate signature information by using the private key known only to the user, and may authenticate the user by decrypting the signature information using the public key stored in the block chain.

Such the conventional user authentication method using a block chain has a limitation in that various attribute information cannot be configured because only the information based on the public key issued to the user is stored in the block chain. Also, since the public key of the user is stored in the block chain, there is a problem of privacy exposure according to execution of the authentication.

In another conventional method for authenticating a user using a block chain (e.g., Civic), a data proof value of the user is initially stored in the block chain, and then a user authentication control device compares a data proof value received from the user with the data proof value stored in the block chain to process authentication of the user. However, even in such the method, since the authentication process is processed based on data owned by the user, the data can be duplicated, and there is a problem that it is difficult to confirm whether a previous owner deletes the data even when the data is delegated to another user.

SUMMARY

Exemplary embodiments of the present disclosure provide a method for user authentication based on a block chain.

Also, exemplary embodiments of the present disclosure provide a method for issuing a token for user authentication based on a block chain.

Also, exemplary embodiments of the present disclosure provide an authentication management server for user authentication based on a block chain.

Also, exemplary embodiments of the present disclosure provide an authentication management server for issuing a token for user authentication based on a block chain.

According to exemplary embodiments of the present disclosure, a user authentication method, performed by an authentication management server constituting a block chain network with a target device, may comprise receiving, from the target device, a transaction including authentication information of a user and a unique value of the target device; determining a token of the user stored in a smart contract based on the authentication information; and authenticating the user based on validity information of the token, ownership information of the token, and the transaction.

Here, the authenticating of the user may comprise determining whether the token is valid based on the validity information of the token; and in response to determining that the token is valid, authenticating the user based on the ownership information of the token and the transaction.

The user authentication method may further comprise transmitting a result of authenticating the user to the target device.

The token may include a unique value in the block chain network in which
information on the smart contract is issued.

The authentication information may include address information of the smart contract and unique address information of a terminal of the user.

Furthermore, according to exemplary embodiments of the present disclosure, a token issuance method, performed by an authentication management server constituting a block chain network with a user terminal, may comprise receiving, from the user terminal, a transaction including authentication information of a user, parameters for setting attribute values of a token, and token generation request information; determining whether to generate a token of the user based on policy information of the smart contract and the authentication information; and in response to determining to generate the token, generating the token of the user including validity information and ownership information based on the policy information and the transaction, and issuing the generated token to the block chain network.

The token issuance method may further comprise transmitting a result of generating the token to the user terminal.

The token may include a unique value in the block chain network in which information on the smart contract is issued.

The authentication information may include address information of the smart contract and unique address information of the user terminal.

The parameters may include information on a target device authenticated by the user terminal.

Furthermore, according to exemplary embodiments of the present disclosure, an authentication management server performing user authentication by constituting a block chain network with a target device may comprise a processor and a memory storing at least one instruction executable by the processor. Also, when executed by the processor, the at least one instruction may be configured the processor to receive, from the target device, a transaction including authentication information of a user and a unique value of the target device; determine a token of the user stored in a smart contract based on the authentication information; and authenticate the user based on validity information of the token, ownership information of the token, and the transaction.

The at least one instruction may be further configured the processor to determine whether the token is valid based on the validity information of the token; and in response to determining that the token is valid, authenticate the user based on the ownership information of the token and the transaction.

The at least one instruction may be further configured the processor to transmit a result of authenticating the user to the target device.

The token may include a unique value in the block chain network in which
information on the smart contract is issued.

The authentication information may include address information of the smart contract and unique address information of a terminal of the user.

Furthermore, according to exemplary embodiments of the present disclosure, an authentication management server performing user authentication by constituting a block chain network with a user terminal may comprise a processor and a memory storing at least one instruction executable by the processor. Also, when executed by the processor, the at least one instruction may be configured the processor to receive, from the user terminal, a transaction including authentication information of a user, parameters for setting attribute values of a token, and token generation request information; determine whether to generate a token of the user based on policy information of the smart contract and the authentication information; and in response to determining to generate the token, generate the token of the user including validity information and ownership information based on the policy information and the transaction, and issue the generated token to the block chain network.

The at least one instruction may be further configured the processor to transmit a result of generating the token to the user terminal.

The token may include a unique value in the block chain network in which information on the smart contract is issued.

The authentication information may include address information of the smart contract and unique address information of the user terminal.

The parameters may include information on a target device authenticated by the user terminal.

According to the exemplary embodiment of the present disclosure, user authentication can be performed using a non-fungible token to provide high security. Also, according to the exemplary embodiments of the present disclosure, transfer of ownership and delegation of the non-fungible token is made possible, so that high security can be maintained and flexible user authentication can be provided. Also, according to the exemplary embodiments of the present disclosure, through the delegation of the token, a block chain can be applied to authentication of a vehicle key and authentication of an entry to a building.

BRIEF DESCRIPTION OF DRAWINGS

Embodiments of the present disclosure will become more apparent by describing in detail embodiments of the present disclosure with reference to the accompanying drawings, in which:

FIG. 6 is a flowchart illustrating a token issuance method according to an exemplary embodiment of the present disclosure; and FIG. 7 is a flowchart illustrating a user authentication method according to an exemplary embodiment of the present disclosure.

Figure 1:
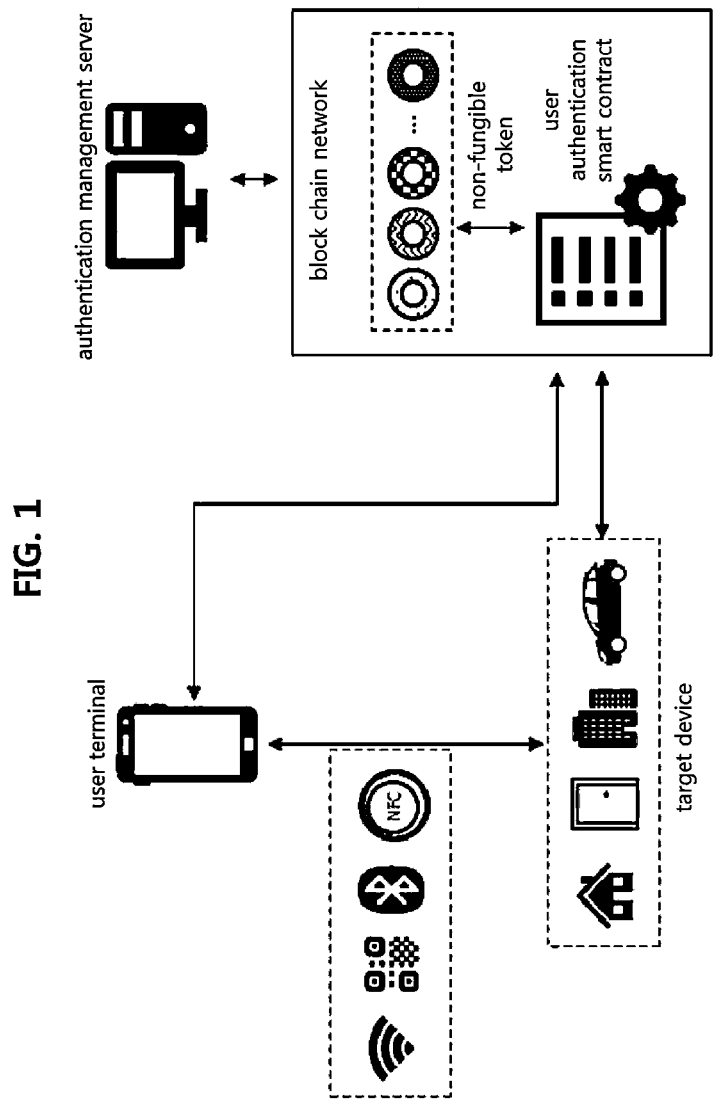
FIG. 1 is a conceptual diagram for explaining a token issuance method according to an exemplary embodiment of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Exemplary embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings.

User authentication methods using a block chain according to exemplary embodiments of the present disclosure may be classified into a method for issuing a token used for user authentication and a method for authenticating a user using the token, and a detailed description of each method will be described with accompanying drawings.

FIG. 1 is a conceptual diagram for explaining a token issuance method according to an exemplary embodiment of the present disclosure.

Referring to FIG. 1, a method of issuing a token for user authentication according to an exemplary embodiment of the present disclosure may be performed by transmission and reception of data between a user terminal and an authentication management server managing a smart contract of a block chain network. Here, the user terminal may refer to a device used by a user for the user authentication, and may refer to any smart device capable of computing, such as a smart phone or a computer.

The user terminal may propagate a token generation request transaction including authentication information for the user authentication, parameters for setting attribute values of a token, and token generation request information to the block chain network managed by the authentication management server. As described below, other request transactions such as token verification, token delegation, token ownership sharing, and token ownership transfer may also be propagated to the block chain network.

Here, the authentication information may include at least one of an address value of a smart contract used for the user authentication, a unique address value of the user terminal, and user information, but is not limited thereto. Also, the authentication information and the parameters may be previously embedded in the user terminal, or additionally stored for the user authentication. The user terminal may store and manage a private key used when creating the transaction.

The authentication management server may manage the smart contract in the block chain network according to the transaction propagation of the user terminal. When the token generation request transaction is propagated to the block chain network by the user terminal, the authentication management server may specify or determine the smart contract by using the information included in the transaction, and generate a non-fungible token based on a policy of the smart contract.

The non-fungible token may include a unique value in the block chain network and may further include at least one attribute value. Here, the attribute value(s) may mean information or value(s) set by the parameters in relation to the user authentication, and may include at least one of a valid period, a usage environment, an authentication range, and owner information of the token, but are not limited thereto. The generated token may be dependent on the user according to the attribute value, and stored as a state value in the block chain. After generating and storing the token, the authentication management server may provide the user terminal with information indicating the completion of generating the token. In other words, the authentication management server may issue the token by propagating a block including information on the generated token to the block chain network.

Figure 2:
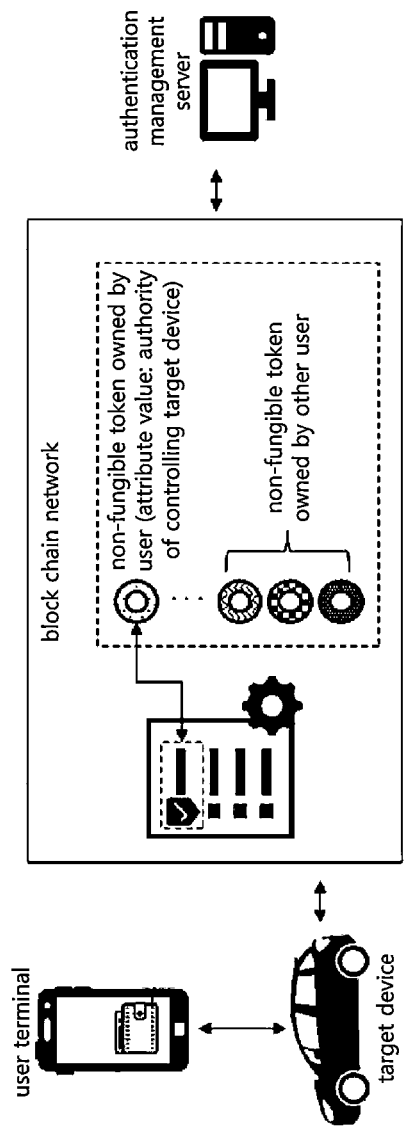
FIG. 2 is a conceptual diagram for explaining a user authentication method according to an exemplary embodiment of the present disclosure.

FIG. 2 is a conceptual diagram for explaining a user authentication method according to an exemplary embodiment of the present disclosure.

Referring to FIG. 2, a user authentication method using a token according to an exemplary embodiment of the present disclosure may be performed by transmission and reception of data between a user terminal, a device to use through user authentication (hereinafter, simply referred to as a 'target device'), and an authentication management server managing a smart contract. Here, the target device may refer to a device that a user wants to use through the user authentication, and may refer to any smart device capable of computing, such as a hotel room door key device, a building access device, or a vehicle door key device.

First, the user terminal may transmit a unique address value of the user terminal and an address value of the smart contract to the target device. Here, the unique address value of the user terminal may mean a wallet address value of the user, but is not limited thereto. Here, the wallet address value may mean an address value of a wallet that manages virtual currency, etc. that can be used in the block chain network. The user terminal may transmit the unique address value of the user terminal and the address value of the smart contract to the target device by using any one of a wireless communication scheme such as a Quick Response (QR) code, Near Field Communication (NFC), or Bluetooth (Bluetooth). However, the communication scheme is not limited thereto. Here, the unique address value of the user terminal and the address value of the smart contract may be referred to as authentication information, and may be different from the authentication information of FIG. 1 in terms of information included in each, without being limited thereto.

The target device may propagate a transaction including the received authentication information and its own unique value to the block chain network. Here, the target device may directly propagate the transaction to the block chain network, or a back-end server may receive the authentication information and the unique value of the target device from the target device, and propagate the transaction including them to the block chain network. However, the detailed propagation scheme is not limited thereto.

Here, the unique value of the target device may mean additional information that can be used for the user authentication, and may include at least one of a location, a model, and an identification (ID) of the target device, but is not limited thereto.

When the transaction is propagated by the target device, the authentication management server may check validity of a token for the smart contract based on the address value of the smart contract included in the transaction, and verify ownership of the token. That is, the authentication management server may confirm a valid period or an authority based on the attribute value of the token and the propagated transaction, and may perform the user authentication by comparing information on a user having ownership of the token with user information included in the transaction.

When the token is valid and the user authentication is successful as a result of the comparison, the authentication management server may issue a block including the transaction propagated by the target device, connect the block to the block chain, and transmit information indicating the completion of authentication to the target device. On the other hand, when the token is invalid or the user authentication is failed as the result of the comparison, the authentication management server may not issue the block including the transaction propagated by the target device and may transmit information on the authentication failure to the target device. However, the information related to the authentication may not be transmitted to the target device.

In the user authentication method using a token according to an exemplary embodiment of the present disclosure, when the user terminal propagates a request transaction, such as token verification, token delegation, token ownership sharing, transfer of ownership of the token, to the block chain network, the above-described comparison based verification process may be performed.

For example, when the user terminal propagates a token ownership delegation request transaction to the block chain network, the authentication management server may reflect the delegation request transaction and perform verification through comparison between information on a token delegated person and information included in the transaction propagated by the target device.

Figure 3:
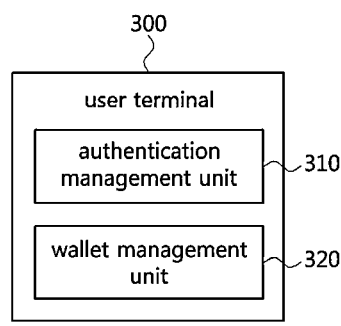
FIG. 3 is a block diagram illustrating a user terminal according to an exemplary embodiment of the present disclosure.

FIG. 3 is a block diagram illustrating a user terminal according to an exemplary embodiment of the present disclosure.

Referring to FIG. 3, a user terminal 300 according to an exemplary embodiment of the present disclosure may include an authentication management unit 310 and a wallet management unit 320. In addition, although not illustrated in FIG. 3, the user terminal 300 may further include a communication unit for propagating a transaction to a block chain network and receiving a result therefor. In this case, the communication unit may include a module responsible for web3-based remote procedure call (e.g., JavaScript Object Notation Remote Procedure Call (JSON-RPC)) on Ethereum or a module responsible for submitting a transaction based on a hyperledger fabric software development kit (SDK).

The authentication management unit 310 may manage or store parameters and an address value of a smart contract, and may perform token issuance or a user authentication request by using a unique value of the user terminal or a unique address value of a user wallet which are managed or stored by the wallet management unit 320 to be described later. In addition, the authentication management unit 310 may perform token verification, token delegation, token ownership sharing, token ownership transfer, or the like by using the parameters, the address value of the smart contract, and at least one of the unique value of the user terminal and the unique address value of the user wallet in the wallet management unit 320.

The wallet management unit 320 may manage a private key used for describing or generating a transaction for token verification, token delegation, token ownership sharing, token ownership transfer, or the like, and may manage or store the unique value of the user terminal and the unique address value of the user wallet.

Figure 4:
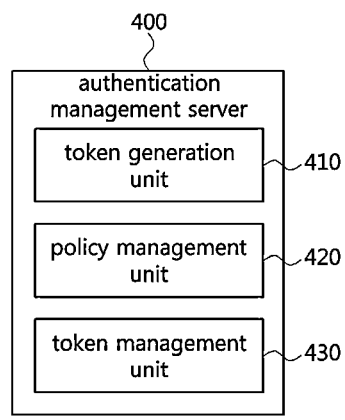
FIG. 4 is a block diagram illustrating an authentication management server according to an exemplary embodiment of the present disclosure.

FIG. 4 is a block diagram illustrating an authentication management server according to an exemplary embodiment of the present disclosure.

Referring to FIG. 4, an authentication management server 400 according to an exemplary embodiment of the present disclosure may include a token generation unit 410, a policy management unit 420, and a token management unit 430. Also, although not illustrated in FIG. 4, the authentication management server 400 may further include a communication unit for propagating a transaction or a block to a block chain network and receiving a result therefor.

Upon receipt of a token generation request transaction propagated by the user terminal, the token generation unit 410 may generate a token of the user based on information included in the token generation request transaction and token policy information. In other words, the token generation unit 410 may determine whether the request conforms to the token policy information of the policy management unit 420 which will be described later, based on the parameters, the authentication information, and the token generation request information included in the token generation request transaction. When the request conforms to the token policy information, a token may be generated. Here, the authentication information may include the unique value of the user terminal or the unique address value of the user wallet.

The policy management unit 420 may manage or store policy information for generating a token, and may update the policy information at regular intervals or whenever there is a change. Here, the policy information may include affiliation information of the user for whom a token is allowed to be generated. It may be possible to determine whether to generate a token by comparing the affiliation information of the user included in the authentication information and the affiliation information included in the policy information, without being limited thereto.

Upon receipt of a transaction including the authentication information of the user terminal and an unique value of a target device, which is propagated by the target device, based on the transaction, the token management unit 430 may perform user authentication on the basis of token verification, token delegation, token ownership sharing, token ownership transfer, or the like. In more detail, when the token management unit 430 receives a transaction for user authentication, the token management unit 430 may verify the validity of the token based on information included in the transaction. When the token management unit 430 determines that the token is valid according to the validation result, the token management unit 430 may authenticate the user by verifying an ownership of the token. In addition, when receiving a transaction such as token delegation and token ownership sharing, the token management unit 430 may modify ownership information of the token by reflecting the corresponding information in the token.

The communication unit may propagate a transaction or a block to a block chain network, and may receive a transaction or a block from the block chain network. In other words, the communication unit may propagate a transaction or a block for information related to user authentication or delegation of a token to the block chain network. Also, the communication unit may transmit information indicating completion of the token generation to the user terminal, and may transmit information on the user authentication result to the target device.

Figure 5:
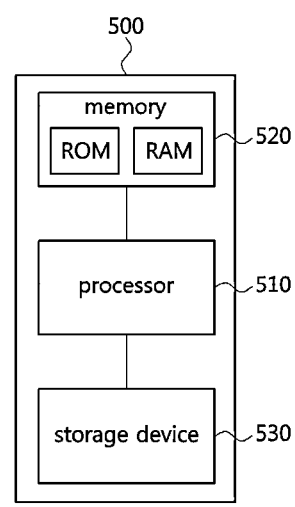
FIG. 5 is a block diagram illustrating an authentication management server according to another exemplary embodiment of the present disclosure.

FIG. 5 is a block diagram illustrating an authentication management server according to another exemplary embodiment of the present disclosure.

Referring to FIG. 5, an authentication management server 500 according to an exemplary embodiment of the present disclosure may include at least one processor 510, a memory 520, and a storage device 530. The authentication management server 500 may configure a block chain network with the user terminal and the target device.

The processor 510 may execute at least one instruction stored in the memory 520 and/or the storage device 530. The processor 510 may refer to a central processing unit (CPU), a graphics processing unit (GPU), or a dedicated processor on which the methods according to the present disclosure are performed. The memory 520 and the storage device 530 may be configured of a volatile storage medium and/or a non-volatile storage medium. For example, the memory 520 may be configured as read only memory (ROM) and/or random access memory (RAM).

The memory 520 may store at least one instruction executable by the processor 510. The at least one instruction may cause the processor to receive, from the target device, a transaction including authentication information of a user and a unique value of the target device; determine a token of the user stored in a smart contract based on the authentication information; and authenticate the user based on validity information of the token, ownership information of the token, and the transaction.

Here, the at least one instruction may further cause the processor to determine whether the token is valid based on the validity information of the token; in response to determining that the token is valid, authenticate the user based on the ownership information of the token and the transaction; and transmit a result of authenticating the user to the target device.

Further, the at least one instruction may further cause the processor to receive, from the user terminal, a transaction including authentication information of a user, parameters for setting attribute values of a token, and token generation request information; determine whether to generate a token of the user based on policy information of the smart contract and the authentication information; and in response to determining to generate the token, generate the token of the user including validity information and ownership information based on the policy information and the transaction, and issue the generated token to the block chain network.

Here, the at least one instruction may further cause the processor to transmit a result of generating the token to the user terminal.

Here, the token may include a unique value in the block chain network in which information on the smart contract is issued, the authentication information may include address information of the smart contract and unique address information of the user terminal, and the parameters may include information on a target device authenticated by the user terminal.

The user terminal and the target device may include at least one processor, a memory, and a storage device like the authentication management server.

FIG. 6 is a flowchart illustrating a token issuance method according to an exemplary embodiment of the present disclosure.

Referring to FIG. 6, in a token issuance method according to an exemplary embodiment of the present disclosure, a user terminal may generate a transaction including authentication information, parameters, and token generation request information (S610), and propagate the generated transaction to a block chain network (S620). Here, the authentication information may include an address value of a smart contract and a unique address value of the user terminal, and the unique address value of the user terminal may mean a wallet address value of a user. However, it is not limited thereto. Also, the parameters may mean information or values for setting attribute values of the token.

When an authentication management server receives the transaction propagated by the user terminal, the authentication management server may determine whether to generate a token based on the authentication information and token generation policy information (S630). Here, the token generation policy information may mean policy information managed by a policy management unit of the authentication management server, and the policy information may include information on affiliation information of the user for whom a token is allowed to be generated. Also, the authentication information may include user information including the user affiliation information, or the like, and the authentication management server may compare affiliation information of users for whom a token is allowed to be generated in the policy information with the user affiliation information in the authentication information to determine whether to generate a token.

When it is determined to generate a token, the authentication management server may generate a token based on the received transaction (S640) and may issue the generated token (S650). Here, the token may be stored as a state value in the smart contract, and the token issuance may be performed by propagating a transaction or a block including information on the generated token to the block chain network.

Thereafter, the authentication management server may transmit information on the completion of the token issuance to the user terminal (S660).

FIG. 7 is a flowchart illustrating a user authentication method according to an exemplary embodiment of the present disclosure.

Referring to FIG. 7, in a user authentication method according to an exemplary embodiment of the present disclosure, a user terminal may transmit authentication information including a unique address value of the user terminal and an address value of a smart contract to a target device (S710). Here, the target device may refer to a device that a user wants to use through the user authentication, and the unique address value of the user terminal may refer to a wallet address value of the user.

The target device may generate a transaction including the authentication information received from the user terminal and the unique value of the target device (S720), and may propagate the generated transaction to a block chain network (S730).

An authentication management server may determine the corresponding smart contract and token based on the information included in the transaction propagated by the target device (S740), and determine whether the token is valid based on the information included in the transaction and validity information of the token (S750). When it is determined that the token is valid, the authentication management server may perform user authentication based on ownership information of the token and the information included in the transaction (S760). When the user authentication is successful, the authentication management server may transmit information on the authentication result to the target device (S770). The user may use the target device for which the information on the authentication result is received after performing the user authentication according to the above-described process.

The methods according to the exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While certain aspects of the present disclosure have been described in the context of an apparatus, it may also represent an explanation according to a corresponding method, wherein the components or apparatuses correspond to the respective steps of the method and the respective features of the steps. Similarly, aspects described in the context of a method may also be represented by features of the corresponding components, items or apparatuses. Some or all of the method steps may be performed by a microprocessor, a programmable computer or a hardware apparatus such as an electronic circuit. In some embodiments, one or more of the most important method steps may be performed by such the apparatus.

In the exemplary embodiments, a programmable logic device (e.g., a field programmable gate array (FPGA)) may be used to perform some or all of the functions of the methods described herein. In the embodiments, the FPGA may operate in conjunction with a microprocessor to perform one of the methods described herein. In general, some of the methods are preferably performed by some hardware device.

While the exemplary embodiments of the present disclosure and their advantages have been described in detail, it should be understood that various changes, substitutions and alterations may be made herein without departing from the scope of the present disclosure.

What is claimed is:

1. A non-transitory computer-readable medium comprising program code instructions stored thereon to execute a method for controlling a target device, the method comprising:

propagating a token generation request transaction to a block chain network, the token generation request transaction including first authentication information for a user authentication and parameters for setting attribute values of a token, wherein the first authentication information includes at least one of an address value of a smart contract, a unique address value of a portable terminal, and user information, and wherein the parameters include information on the target device to be controlled by the portable terminal;

receiving information of a token generating completion from an authentication management server which manages the smart contract on the block chain network; and transmitting at least one of the unique address value of the portable terminal and the address value of the smart contract to the target device which communicates with the block chain network, wherein the parameters include the information on the target device authenticated by the authentication management server, wherein the method comprises controlling the target device by the portable terminal, and wherein the controlling of the target device by the portable terminal comprises providing entry to a physical location restricted by a component of the target device.

2. The non-transitory computer-readable medium in accordance with claim 1, wherein the token is a non-fungible token.

3. The non-transitory computer-readable medium in accordance with claim 2, wherein the non-fungible token includes a unique value in the block chain network.

4. The non-transitory computer-readable medium in accordance with claim 2, wherein the non-fungible token includes information or a value set by the parameters in relation to the user authentication.

5. The non-transitory computer-readable medium in accordance with claim 2, wherein the non-fungible token includes at least one of a valid period, a usage environment, an authentication range, and owner information of the non-fungible token.

6. The non-transitory computer-readable medium in accordance with claim 1, wherein the target device is a door key device, a building access device, or a vehicle door key device.

7. The non-transitory computer-readable medium in accordance with claim 1, wherein the portable terminal includes an authentication management unit and a wallet management unit.

8. The non-transitory computer-readable medium in accordance with claim 7, wherein the authentication management unit manages the parameters for setting attribute values of the token and the address value of the smart contract.

9. The non-transitory computer-readable medium in accordance with claim 7, wherein the wallet management unit manages the unique address value of the portable terminal or a unique address value of a user wallet.

10. In a system including an authentication management server, a portable terminal and a target device to be controlled by the portable terminal, which are to communicate with one another, the portable terminal configured to:

propagate a transaction to a block chain network, the transaction including first authentication information for a user authentication and parameters for setting attribute values of a token, wherein the first authentication information includes at least one of an address value of a smart contract, a unique address value of the portable terminal, and user information, and wherein the parameters include information on the target device to be controlled by the portable terminal;

receive information of a transaction completion from the authentication management server which is configured to communicate with the block chain network; and wirelessly transmit at least one of the unique address value of the portable terminal and the address value of the smart contract to the target device which is configured to communicate with the block chain network, wherein the parameters include the information on the target device authenticated by the authentication management server, and wherein the portable terminal is configured to control the target device to provide entry to a physical location restricted by a component of the target device.

11. The portable terminal in accordance with claim 10, wherein the token is a non-fungible token.

12. The portable terminal in accordance with claim 10, wherein the transaction is a request transaction of a token generation, a token verification, a token delegation, a token ownership sharing, or a token ownership transfer.

13. A portable terminal for controlling a target device based on an authentication on a block chain network, the portable terminal comprising:

a processor; and a memory, wherein the processor is configured to:

propagate a transaction for requesting a token generation, a token verification, a token delegation, a token ownership sharing, or a token ownership transfer to the block chain network that is managed by an authentication management server, the transaction including first authentication information for a user authentication and parameters for setting attribute values of a token, wherein the parameters include information on the target device to be controlled by the portable terminal; and wirelessly transmit second authentication information to the target device, wherein the second authentication information includes a unique address value of the portable terminal and an address value of a smart contract associated with the token, and wherein the target device is configured to propagate to the block chain network a unique value of the target device and an authentication request transaction based on the second authentication information to the block chain network in order to control the target device, wherein the parameters include the information on the target device authenticated by the authentication management server, and wherein the portable terminal is configured to control the target device to provide entry to a physical location restricted by a component of the target device.

14. The portable terminal in accordance with claim 13, wherein the first authentication information is different from the second authentication information.

15. The portable terminal in accordance with claim 13, wherein the first authentication information is the same as the second authentication information.

16. The portable terminal in accordance with claim 13, wherein the unique address value of the portable terminal is a wallet address value of a user.

17. An electronic device to be controlled by a portable terminal based on an authentication process which is to be executed on a block chain network, the electronic device configured to:

receive first authentication information from the portable terminal, wherein the first authentication information includes a unique address value of the portable terminal and an address value of a smart contract, wherein the portable terminal is configured to request a transaction for issuing a token to an authentication management server, wherein the transaction includes parameters for setting attribute values of the token, and wherein the parameters include information on the electronic device to be controlled by the portable terminal;

propagate a transaction to the block chain network, wherein the transaction to the block chain network includes second authentication information and an authentication request transaction, and wherein the authentication request transaction includes a unique value of a target device; and receive authentication completion information from the authentication management server for determining whether the token is valid, wherein the parameters include the information on the electronic device authenticated by the authentication management server, and wherein the electronic device is configured to be controlled by the portable terminal to provide entry to a physical location restricted by a component of the electronic device.

18. The electronic device in accordance with claim 17, the electronic device is a hotel room door key device, a building access device, or a vehicle door key device.

19. The electronic device in accordance with claim 17, wherein the token is a non-fungible token.

20. The non-transitory computer-readable storage medium in accordance with claim 1, wherein the target device is different from the portable terminal.

* * * * *